United States Patent [19]

Cuozzo et al.

[11] Patent Number: 4,523,362
[45] Date of Patent: Jun. 18, 1985

[54] METHOD OF MAKING A ROLLER BEARING ASSEMBLY

[75] Inventors: Anthony Cuozzo; John D. Achee, both of Torrington, Conn.

[73] Assignee: The Torrington Company, Torrington, Conn.

[21] Appl. No.: 528,455

[22] Filed: Sep. 1, 1983

[51] Int. Cl.³ .............................................. B21D 53/12
[52] U.S. Cl. ......................... 29/148.4 A; 29/149.5 C; 29/148.4 R; 384/560
[58] Field of Search .................. 29/148.4 A, 148.4 C, 29/149.5 C; 308/207 R, 198, 216

[56] References Cited

U.S. PATENT DOCUMENTS

Re. 19,508  3/1935  Brown ..................... 29/148.4 A X
2,038,474   4/1936  Brown ........................ 29/148.4 A
2,038,475   4/1936  Brown ........................ 29/148.4 A

*Primary Examiner*—Howard N. Goldberg
*Assistant Examiner*—John T. Burtch
*Attorney, Agent, or Firm*—F. S. Troidl

[57] ABSTRACT

A protrusion is formed on the free end of an axially extending lip of an outer race member. The free end of the protrusion is axially and radially spaced from the free end of the remaining part of the axially in-turned lip to permit the passing of a reduced end of a reduced end roller. The reduced end rollers are inserted into the outer race member through the protrusion. After all the rollers are in place within the outer race member the free end of the protrusion is closed by heating the protrusion and pressing the protrusion to provide an in-turned lip of substantially the same shape throughout the circumference of the lip.

4 Claims, 6 Drawing Figures

METHOD OF MAKING A ROLLER BEARING ASSEMBLY

This invention is a method of making a roller bearing in which an outer member is provided at its ends with radially in-turned and curled flanges. The individual rollers have reduced ends that are to be received and held against separation so that the assembly of outer member and rollers provides a unit roller bearing assembly.

A current method of making a roller bearing assembly is to retain the rollers on a bearing raceway by having both ends of the raceway bent over to provide laterally extending integral trough shaped retaining means for the reduced ends of the rollers. The tubular raceway is formed from a metal blank. It has been the practice to fully form one trough shaped retaining means and partically form the other when the raceway is formed. The partially formed trough shaped retaining means is so formed to allow the insertion of the needle rollers or rolling elements. Since it is necessary to heat treat the raceway prior to assembly of the rolling elements, special processes are required to maintain the partially formed trough shaped retaining means in a condition suitable for bending to the fully formed condition. The U.S. Pat. No. 2,038,475 issued Apr. 21, 1936 to E. K. Brown, and entitled "Anit-Friction Bearing and Method of Making the Same" shows one currently used method of making a roller bearing assembly.

One difficulty with currently used methods of making a roller bearing assembly is that though one lip is completely curled the second lip cannot be completely curled until after the rollers have been inserted into the outer race member. Before the rolls are inserted into the outer race member, the outer member is carburized and hardened. However, once the metal is hardened it is not malleable enough to be bent without possible crakcing. Therefore, before the outer race member is heat treated, the partially curled lip is plated with copper on the outer surface. The copper acts as a barrier to carbon during the carburization process and any area so plated will remain soft and bendable during the hardening process.

After heat treat the copper is stripped from the upper lip by immersing in a cyanide solution. The rolls are then loaded into the outer race member and the final curl of the partially curled lip is made to retain the rollers.

With the conventional method of making roller bearing assembly, cyanide is used. Cyanide is potentially dangerous to use and to store as well as being ecologically hazardous to dispose of as waste. Copper being a heavy metal also possess an ecological problem when disposing of waste. It would be highly desirable to have a method of making a roller bearing assembly which does not require the use of copper plating with the subsequent need to use cyanide to remove the copper plate.

Among other advantages of our new method of making a roller bearing assembly, fewer steps are needed, no copper plating is needed, and no cyanide is needed.

Briefly described, our new method of making a roller bearing assembly comprises the steps of forming an outer race member having radially in-turned flanges at its ends and having axially in-turned lips on the flanges to provide two annular troughs. A roller end receiving portion is formed on one in-turned lip. This formed receiving portion is adapted to permit the passing of one reduced end of reduced end rollers into an annular trough. The thus formed outer race member is heat treated. A plurality of reduced end rollers is inserted into the outer race member by inserting one reduced end into one annular trough and passing the other reduced end through the end roller receiving portion into the other annular trough. Thereafter, the roller end receiving portion is closed to form a full complement bearing.

The invention as well as its many advantages may be further understood by reference to the following detailed description and drawings in which.

In the various figures like parts are referred to by like numbers.

Figure 1:
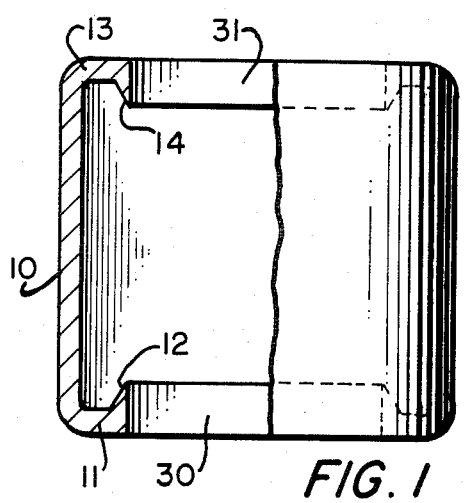
FIG. 1 is a view, in radial section, showing one preferred outer race member.

Referring to the drawings and more particularly to FIG. 1, the outer race member may be made and formed as shown in the Brown U.S. Pat. No. 2,038,475 except that both flange ends are brought to final shape before the insertion of rollers. Such an outer race member has a cylindrical race portion 10, a first end flange 11 provided with an in-turned lip 12; and a second flange 13 provided with an in-turned lip 14. In the illustrated form, both of the end flanges have concentric apertures 30 and 31 so that the structure may be inserted upon a shaft by introduction at either end thereof.

As described in the Brown U.S. Pat. No. 2,038,475, the cup may be made from sheet metal, by the usual drawing and cupping operations, cutting a circle from the bottom of the cup to leave the lip 12 and then completing the flanges 13 and the lip 14.

Figure 2:
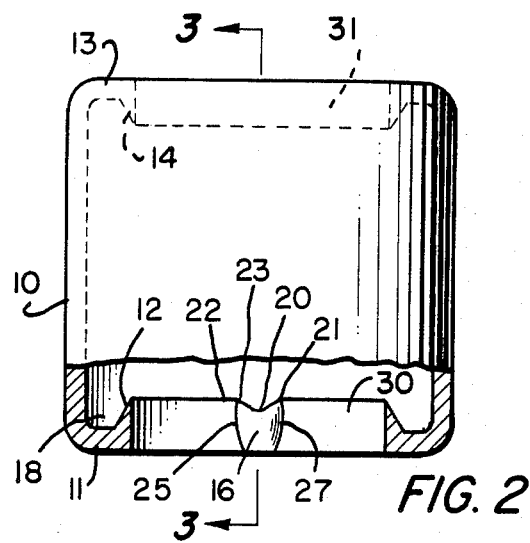
FIG. 2 is a view, partly in section, of the outer race member of FIG. 1 after the protrusion to allow the reduced roller ends of the rollers to be placed in the outer race member has been formed.
Figure 3:
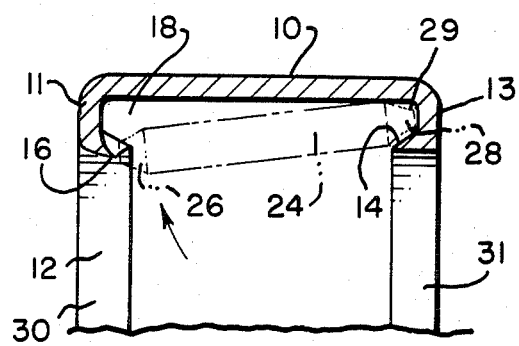
FIG. 3 is a view, taken along lines 3—3, of FIG. 2 and in the direction of the arrows.
Figure 4:
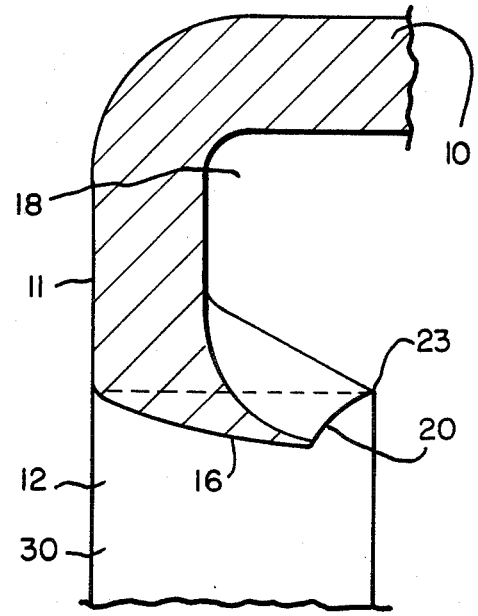
FIG. 4 is an enlarged view and showing the structure of the protrusion.

After the outer race member of FIG. 1 has been formed it can be seen by looking at FIG. 2, FIG. 3 and FIG. 4, that a radially inwardly extending protrusion 16 has been formed on the in-turned lip 12. The protrusion 16 forms a roller end receiving portion adapted to permit the passing of a reduced end of reduced end rollers into the trough 18 formed by sleeve 10, flange 11, and lip 12. The protrusion 16 may be formed by a punch or other suitable apparatus shaped to be inserted in the trough 18 and expand a portion of the lip 12 radially inwardly. As can be seen from FIG. 2 and FIG. 4, the free end 20 of the protrusion 16 extends from points 21 and 23 of the free end 22 of the lip 12 both radially inwardly and axially toward the flange 11. The protrusion 16 has a curved surface integral with lip 12 at lines 25 and 27. Thus, the shape of the protrusion 16 with its free end 20 is such that a reduced end portion of a reduced end roller will be permitted to pass into the trough 18. Preferably, only one protrusion large enough to pass through one roller at a time is provided. But, if desired, more than one circumferentially spaced protrusion may be provided and/or the protrusion made larger.

The piece can then be hardened and tempered as desired to obtain maximum strength. It can be tumbled or otherwise treated to remove any dark oxide formed during the tempering or hardening operations. It will be noted that this completed outer member is clear for inspection even after the final hardening and polishing; and hence, defects apparent only at inner surfaces of the flanges, for example, can be found in such pieces rejected.

Referring to FIG. 3 the rollers 24 are of relatively small diameter and are of circular cross-section throughout the main body portion thereof. However, the relative length and diameter of the rollers will depend upon the particular use to which the bearing is to be put. The ends 26 and 28 are reduced in cross-section. Any type of roller which affords a reduced end portion may be substituted for the rollers 24.

The particular type of reduced end roller which will be used depends upon the purposes for which the bearing is to be used. The rollers 24 are inserted into the outer race member by placing the outer race member on a machine with the protrusion 20 in the upper most position. Looking at FIG. 3, a plurality of rollers 24 are fed into the outer race member so that the reduced end portion 28 fits into the trough 29 formed by sleeve 10, flange 13, and lip 14. The roller reduced end 26 passes by the free end 20 of protrusion 16 and into the trough 18. By having the protrusion 16 at its upper most position, the rollers will fall by gravity with the first roller falling to the very bottom and subsequent rollers will land on top of the first roller until a full complement of rollers are in the sleeve 10. A "full-complement" roller bearing is a bearing having a full peripheral complement of rollers so that a separator or cage is not necessary to maintain the peripheral spacing. Without a separator, it is of particular value to have a structure which is capable of being handled as a unit to prevent accidental disassembly.

Figure 5:
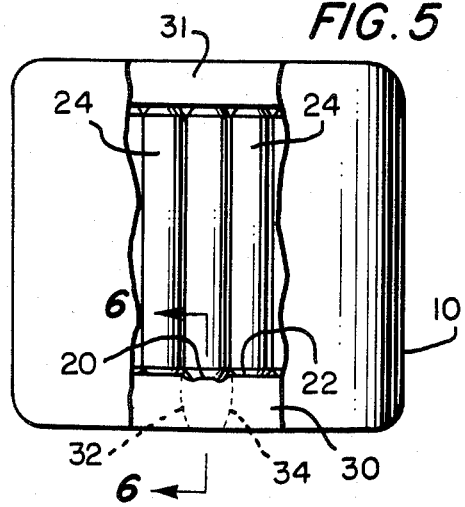
FIG. 5 is a view, partly in section, showing the completed roller bearing assembly.
Figure 6:
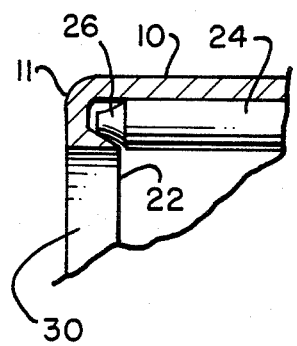
FIG. 6 is a fragmentary view, taken along lines 6—6 of FIG. 5.

After all of the rollers 24 have been inserted into the outer race member, it is necessary to close the protrusion 16 to retain the reduced ends of the roller in the outer race member. Since the outer race member was hardened after the protrusion 16 was made, it is necessary in the preferred embodiment to heat the protrusion 16 to permit the protrusion to be pushed radially outwardly. The protrusion may be heated by any suitable means such as by resistance heating. Then a suitable tool is used to radially expand the protrusion 16 to the position shown in FIG. 5. Looking at FIG. 5 and FIG. 6 it can be seen that the protrusion 16 has been expanded radially outwardly to provide an in-turned lip of substantially the same shape throughout its circumference. The broken lines 32 and 34 in FIG. 5 show where the sides 25 and 27, respectively, of the protrusion 16 used to be.

In operation, an outer race member is formed into the shape shown in FIG. 1. The protrusion 16 is then formed on the outer race member. The outer race member with its protrusion 16 is then heat treated to properly harden the outer race member. Thereafter the rollers 24 are inserted into the outer race member by placing the reduced end 28 in the trough 29 and passing the reduced end 26 through the protrusion 16 into the trough 18. After the full complement of rollers 24 has been placed in the outer race member, the protrusion is heated and then pressed radially outwardly until the lip 12 is again substantially the same shape throughout its circumference.

No copper plating is needed and, therefore, no storage of, and use of cyanide is required.

We claim:

1. The method of making a roller bearing assembly comprising: forming an outer race member having radially inturned flanges at its ends and having axially inturned lips on said flanges to provide first and second annular troughs; forming on one inturned lip a roller end receiving portion adapted to permit the passing of only one reduced end of reduced end rollers at a time through said roller end receiving portion into the first annular trough after the other reduced end of the reduced end rollers has been inserted into the second annular trough; heat treating the thus-formed outer race member; inserting a plurality of reduced end rollers into the outer race member by inserting one reduced end into the second annular trough and passing the other reduced end through the roller end receiving portion into the first annular trough; and closing the roller end receiving portion to form a full complement bearing.

2. The method of claim 1 wherein: the roller end receiving portion is formed by a punch shaped to radially inwardly expand a portion of the free end of the axially inturned lip to provide a protrusion having its free end both axially and radially spaced from the free end of the remaining portion of the axially inturned lip to permit the passing of a reduced end of reduced end rollers.

3. The method of claim 2 wherein: the free end of the protrusion is closed by heating the protrusion and pressing the protrusion radially outwardly to provide an inturned lip of substantially the same shape throughout its circumference.

4. The method of making a roller bearing assembly comprising: shaping a small circumferential portion of a lip extending axially from a radially extending end flange of an outer race member into a roller end receiving portion to permit the passing of only are reduced end of a roller at a time into the annular trough defined by said end flange and said lip; filling the annular trough with reduced end rollers by passing the reduced ends of the rollers through the roller end receiving portion; and closing the roller end receiving portion to form a full complement bearing.

* * * * *